United States Patent

Colley

[15] 3,691,771

[45] Sept. 19, 1972

[54] GAS TURBINE ENGINE THRUST DEFLECTORS

[72] Inventor: Rowan Herbert Colley, Derby, England

[73] Assignee: Rolls Royce Limited, Derby, England

[22] Filed: April 1, 1971

[21] Appl. No.: 130,417

[30] Foreign Application Priority Data

April 2, 1970 Great Britain.........15,761/70

[52] U.S. Cl. .............................................60/226 A
[51] Int. Cl. .............................................F02k 3/02
[58] Field of Search ..............60/226 A, 226 R, 229; 239/265.33, 265.37

[56] References Cited

UNITED STATES PATENTS 3,603,090  9/1971  Billinger et al. .............60/229
3,608,314  8/1969  Colley ..........................60/229

Primary Examiner—Carlton R. Croyle
Assistant Examiner—Robert E. Garrett
Attorney—Cushman, Darby & Cushman

[57] ABSTRACT

The blocker flaps in the fan duct of a gas turbine ducted fan engine are mounted for simultaneous pivoting across the fan duct and movement bodily downstream thereof so as to attain the required throat area for the subsequently reversed flow of fan air through the reverser aperture in the fan cowl.

3 Claims, 3 Drawing Figures

GAS TURBINE ENGINE THRUST DEFLECTORS

This invention concerns a thrust reverser for gas turbine engines having annular ducts through which the propulsive fluids flow to atmosphere.

In the past, considerable difficulty has been experienced in retaining efficient reversal of the propulsive fluids produced by gas turbine engines particularly engines of the type which have an annular fluid flow duct. One problem is that the radial dimension of the annular duct is small relative to the axial dimension required in the reversed fluid outlet aperture which is provided in the cowl or casing, which cowl or casing forms the outer wall of the duct. If the aperture could be made completely annular, with no obstructions therein, then in theory, an aperture having an axial length equal to the radial depth of the annulus should be sufficient for the fluid to flow through when the annulus is suitably blocked against axial flow, thus the same means could be used to alternately block the aperture and the annulus. However, a completely annular aperture is not practicable, support members must extend across the aperture axially of the engine so as to join those portions of the cowl which define the aperture and thus the aperture would be partially obstructed, the effect being interalia, to choke the aperture, lose reverse thrust efficiency and create undesirable back pressures on the fluid compressor. Thus, the aperture must be made bigger in area, than the annular duct.

A plurality of axially aligned blocker flaps have been used, some of which are adapted to move when reversal is required so as to leave spaces between themselves for the fluid to flow through and the remainder moved to block the annulus. These mechanisms are unavoidably complicated and therefore difficult to construct so as to ensure reliability. Moreover they normally incur weight penalties and create some obstruction even though moved, thus reducing the throat. Moreover blocker flaps which fold upon themselves so as to change their shape when moved to a blocking position have been used, but hereto, difficulty has been experienced in obtaining the correct throat area between the duct and aperture so as to avoid choking.

It is thus an object of the present invention to provide blocker apparatus of much simpler and lighter construction than prior constructions, which is capable of alternately blocking both the aperture and the relatively small annulus and which is at least as efficient as said prior constructions.

Accordingly the present invention comprises a fan cowl for a gas turbine engine which cowl includes at least one axially translating portion which when translated in one direction, uncovers or forms an aperture in said cowl, and at least one pivotable blocker flap which, when pivoted in one direction further uncovers or further forms said aperture, the at least one blocker flap having a pivot axis which itself is mounted for at least arcuate movement when said blocker flap is caused to pivot.

Preferably the translatable portion of the cowl is connected to the at least one blocker flap to cause movement thereof when said translation occurs.

Preferably the cowl is adapted to surround a fan rotatably and coaxially mounted on a gas turbine engine.

Alternatively the cowl may form part of a jet pipe of a gas turbine engine having an exhaust bullet mounted at or adjacent the nozzle of the gas turbine engine, the cowl and nozzle forming an annular fluid flow duct therebetween.

The invention will now be described with reference to the accompanying drawings in which.

Figure 1:
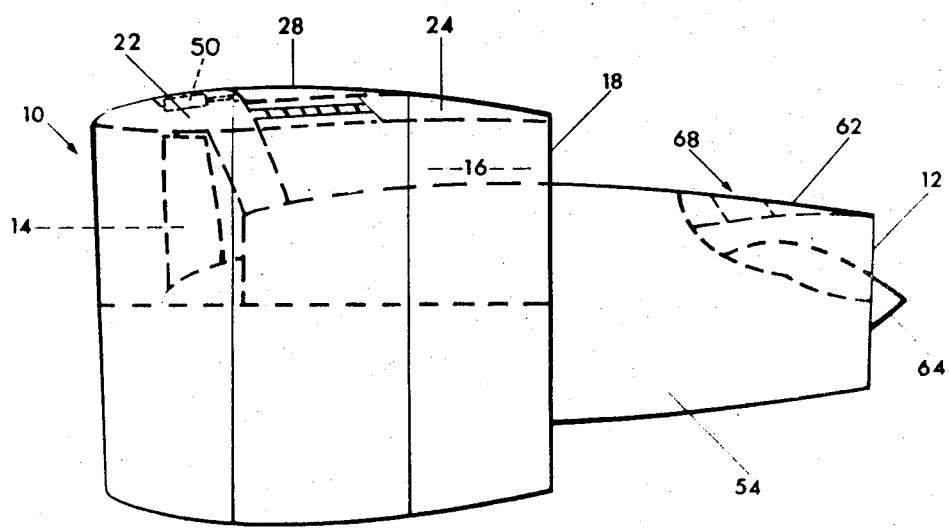
FIG. 1 is a diagrammatic view of a gas turbine engine having a ducted fan.

In FIG. 1 a gas turbine ducted fan engine is indicated generally by the numeral 10. The engine comprises a compressor, combustion equipment, an expansion turbine and an exhaust nozzle 12 of which only the latter is shown.

A stage of fan blades 14 is rotatably and coaxially mounted at the upstream end of the engine, upstream that is, relative to the flow of fluids through the engine.

The fluid is of course, ambient air, some of which is mixed with fuel and burnt, returning to atmosphere via the turbine and nozzle 12 in the form of hot gases and the remainder passing through the fan 14 to by-pass the gas turbine portion and return to atmosphere via a fan duct 16 and nozzle 18.

The outer wall of the fan duct 16 is formed by the inner wall of the fan cowl 20. Cowl 20 comprises upstream portion 22, downstream portion 24 rigidly joined to upstream portion 22 by a plurality of axially extending, circumferentially spaced ribs 26 (Fig. 2) and a mid-portion 28 which is translated axially of the engine so as to selectively uncover an aperture 30 defined by upstream and downstream portions 22 and 24.

The radially inner end (radially that is, relative to the engine axis) of aperture 30 is closed by a plurality of blocker flaps 32 which are arranged peripherally of the cowl and which have fillet flaps 34 pivotally attached thereto for pivoted movement about pivot axes 36.

The blocker flaps are each mounted at their downstream ends for both pivot movement and for movement bodily in an axial direction. The pivoted movement takes place about an axis 38 and, at the same time, movement bodily occurs in an axial direction by virtue of the blocker flaps having roller members 40 which contain axes 38, roller members 40 being mounted in track members 42 which are fixed to the downstream portion 24 of cowl 22.

The roller members 40 are rotatably mounted on ribs 44 with which each blocker flap 32 is provided. Ribs 44 extend beyond the downstream end of the blocker flaps and the ribs own downstream extremity are pivotally connected to links 46. Links 46 are in turn connected for pivoting about an axis 48 which has a fixed location within downstream portion 24 of cowl 22.

Figure 2:
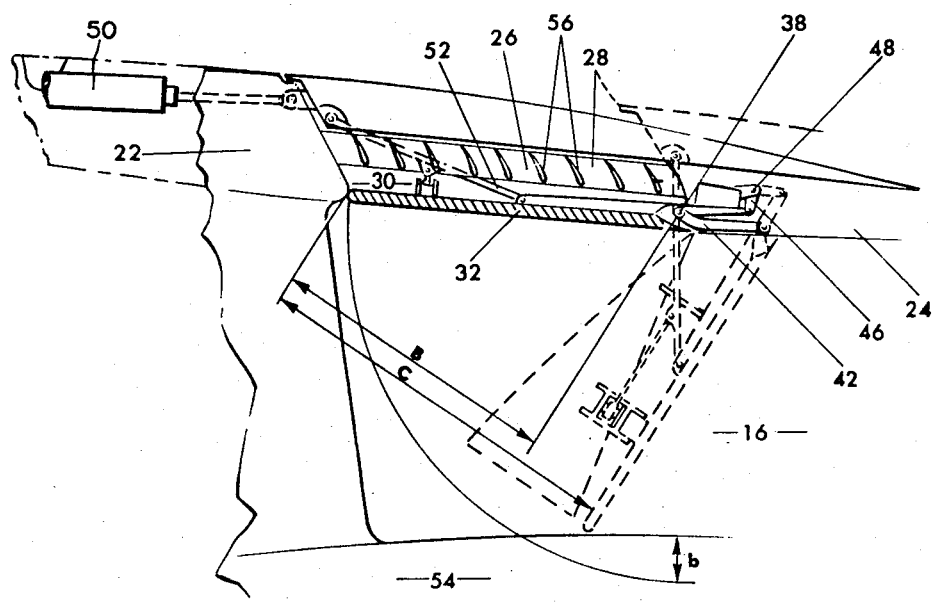
FIG. 2 is an enlarged axial part section through the engine and ducted fan.
Figure 3:
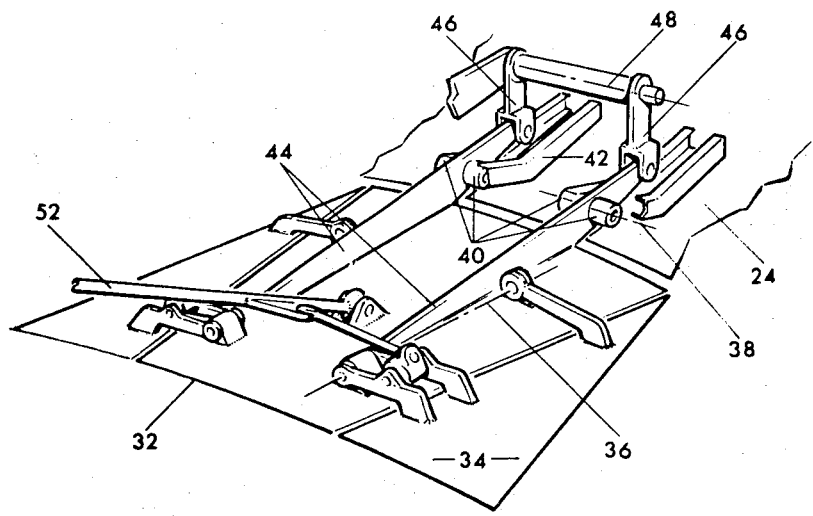
FIG. 3 is a pictorial view of the blocker flap of FIG. 2.

Track members 42 are curved in a substantially radially outwardly direction at their upstream ends and when blocker flaps 32 are in the full line position shown in Fig. 2 wherein they close the inner end of aperture 30, rollers 40 lie at the upstream end thereof. Moreover, reference to Fig. 2 shows translating portion 28 of cowl 22 to be covering the outer end of aperture 30.

An engine as described herein is particularly suited to power aircraft and its operation when so utilized will now be described:

On touchdown of the aircraft, the pilot actuates rams 50 or the like, which are connected to translating portion 28 or cowl 22. The rams extend and push portion 28 downstream. This movement is transmitted via links 52 to blocker flaps 32 which are thus caused to move bodily in a downstream direction by movement of roller members 40 along first the curved portion and then the straight portions of tracks 42.

Pivoting of flap members 32 is brought about by their connection with link 46 which pivots about axis 48 and thus lifts the downstream end of flaps 32, tipping the upstream ends thereof inwards towards the outer casing 54 of the gas turbine portion of the engine as shown in dotted lines in FIG. 2. Fan duct 16 is thus blocked in the axial direction and fan air will be deflected radially outwardly through aperture 30 by blocker flaps 32. If it is required to deflect the fan air in an upstream direction on leaving the aperture 30 so as to provide thrust reversal, guide vanes 56 may be provided in the aperture and are so shaped and positioned as to effect the desired deflection.

As can be seen in FIG. 2 the length of aperture 30 is greater than the radial depth of annulus 16 by the amount 'b'. Blocker flaps 32 extend the full axial length of aperture 30 and, if the flaps were pivoted about a fixed axis at 'A' at the downstream end of aperture 30, then the throat 'B' of the passage thus formed would be of insufficient area for the fan air to flow through without choking. However, simultaneous pivoting and bodily movement of the blocker flaps to the position shown is dotted lines in Fig. 2 increases the throat to the value 'C' which is sufficient to obviate choking. Thus the flaps have achieved the blocking alternately of the aperture and duct without changing shape and on blocking the annulus 16, without choking the throat of the passage through which the fan air is deflected so as to pass to aperture 30. Moreover, while a number of flaps 32 will be required to be spaced peripherally of the inner end of aperture 30 so as to completely close it when thrust reversal or deflection is not required, each blocker flap is of one piece construction and is of sufficient length to axially span aperture 30. The one piece construction permits a light weight, simple structure of great rigidity to be utilized.

The invention is described herein in connection with the fan cowl of a gas turbine ducted fan engine, but, as is diagrammatically illustrated in FIG. 1 the invention could be applied to a gas turbine engine which does not have a ducted fan. In this arrangement, the jet pipe wall 62 and an exhaust bullet 64 would combine to form an annulus 66 and the reverser or deflector apparatus described herein would be positioned as indicated by numeral 68.

I claim:

1. A gas turbine ducted fan engine cowl of double wall construction comprising an outer wall including an annular, axially translatable portion, and an inner wall including a plurality of pivotable flaps spaced circumferentially of said inner wall, each flap having a pair of rollers at its downstream end, a plurality of pairs of guide tracks fixed between the walls of the cowl and spaced circumferentially thereof and means for translating said annular portion axially of the cowl, and wherein said flaps have their rollers located in respective guide tracks so as to be pivoted about the rollers axes, whilst the rollers are movable along said guide tracks so as to bodily displace said flaps axially of the cowl.

2. A gas turbine ducted fan engine cowl as claimed in claim 1 wherein said annular translatable portion and said flaps are interconnected for simultaneous movement in their respective directions.

3. A gas turbine ducted fan engine cowl as claimed in claim 1 wherein said means for translating said annular portion comprises rams.

* * * * *